April 26, 1966     J. H. KEATING     3,247,555
ALUMINUM MELTING FURNACE
Original Filed Aug. 12, 1960     3 Sheets-Sheet 3
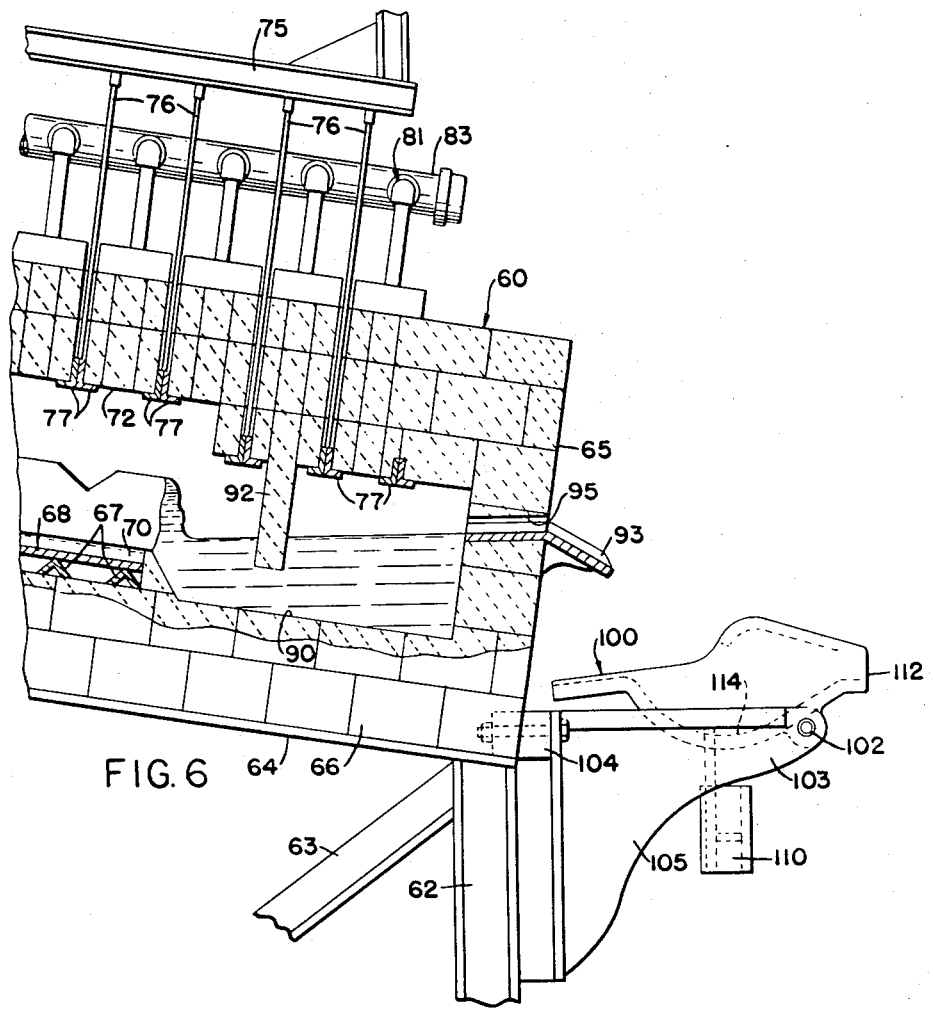
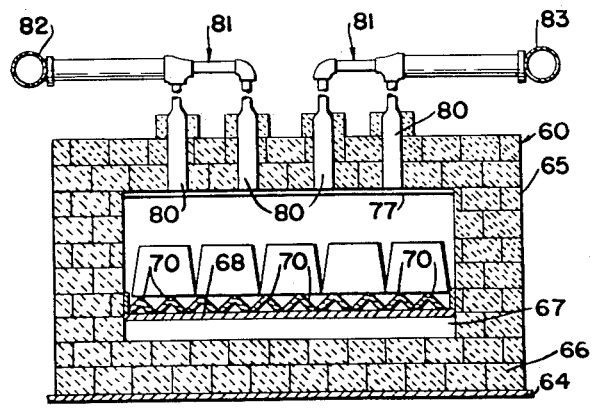
INVENTOR.
JOHN H. KEATING
BY
ATTORNEYS

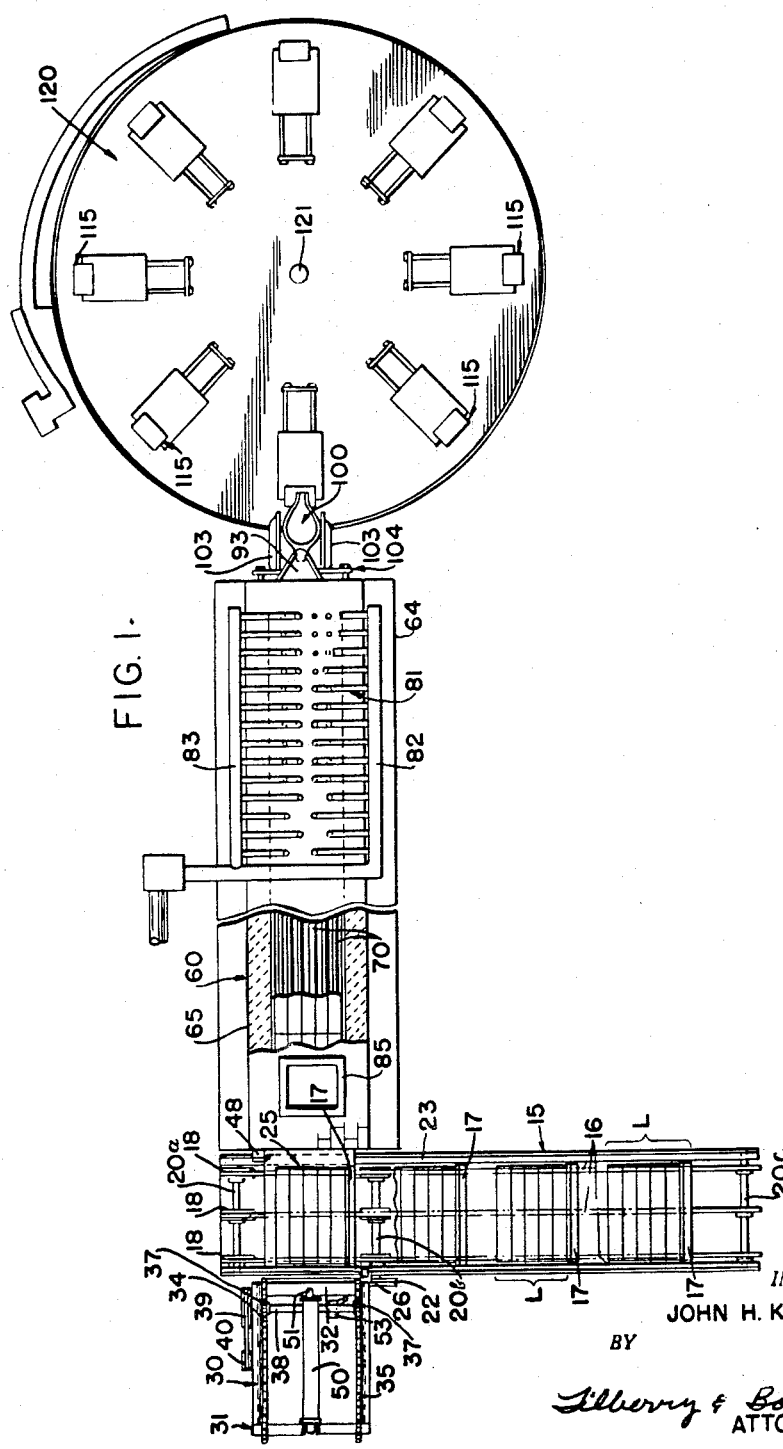

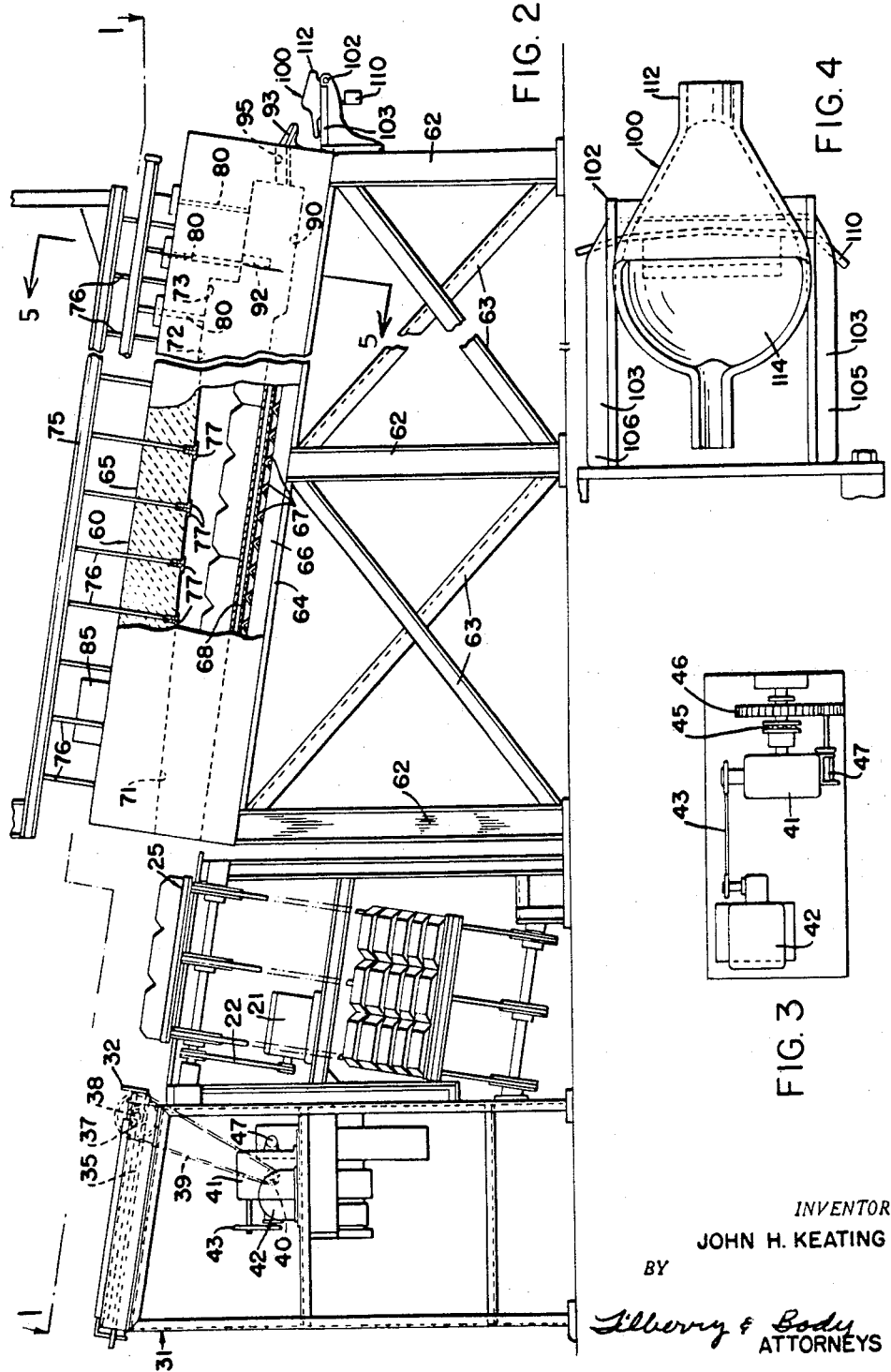

United States Patent Office 3,247,555
Patented Apr. 26, 1966

3,247,555
ALUMINUM MELTING FURNACE
John H. Keating, Cleveland, Ohio, assignor to Monarch Aluminum Mfg. Company, Cleveland, Ohio, a corporation of Ohio
Continuation of application Ser. No. 49,318, Aug. 12, 1960. This application Nov. 23, 1964, Ser. No. 414,511
5 Claims. (Cl. 22—79)

This application is a continuation of a co-pending application Serial No. 49,318 filed August 12, 1960 entitled "Aluminum Melting Furnace" now abandoned which application is in turn a continuation-in-part of application Serial No. 442,661 filed July 12, 1954, now abandoned, entitled "Method and Apparatus for Continuously Melting Aluminum."

This invention relates to the art of commercially casting nonferrous metals, and in particular to a novel furnace and a novel method of continuously melting aluminum on a commercial production scale wherein the molten aluminum is thereafter cast into consumer product molds at a rate equal to the production of the molten aluminum.

In the commercial melting and casting of nonferrous metals, aluminum presents special problems which inherently reside in the physical properties of the metal. Thus, melting equipment and melting and handling procedures and processes reflect to a considerable extent on the final quality and cost of aluminum castings. For instance, molten aluminum alloys possess a marked tendency to absorb hydrogen. Gas absorption by molten aluminum will be proportionately greater the higher the temperature of the aluminum and the longer the time the aluminum is held at this elevated temperature. Gas absorption is also increased the longer the aluminum is in direct exposure to products of combustion.

Another characteristic of aluminum, important from the standpoint of melting and handling, is the readiness with which aluminum combines with oxygen to form oxides and so-called dross, i.e., aluminum oxide skin. The formation of an oxide skin during melting is an advantage in preventing further oxidation of the metal and in preventing absorption of hydrogen. However, dross that is formed as a result of oxidation if improperly handled may become entrapped in the molten aluminum and will constitute a defect in the final casting, as well as reduce the machineability of the casting.

These characteristics of aluminum therefore suggest that agitation of the aluminum should be avoided while in the molten state, as well as during the transfer from the furnace to the pouring ladle, and during the pouring operation. Heretofore, the cast aluminum industry has to a large extent been at least indifferent to these factors in the handling of molten aluminum which directly affect the quality of the casting. By way of illustration, aluminum is almost universally melted in reverberatory furnaces, in large quantities, held at high temperatures, for long periods of time, and thoroughly agitated by hand-ladling from the furnace as well as by charging cold ingots into the furnace as the molten metal is paid out, and by poking and breaking and stirring these ingots to accelerate their melting.

In some instances where continuous melting has been attempted, ingots are moved on a conveyor and dumped in a solid state into a refractory lined melting vessel having a pouring lip. A series of molds passed below the pouring lip are filled at a rate according to the weight of liquid metal displaced from the molten bath by the incoming solid ingots rather than by the rate of production of molten metal. This arrangement also leads to considerable agitation of the bath in view of the ingots periodically plunging through the oxide dross causing an excessive accumulation of oxide to the detriment of melting and pouring operations.

The present invention contemplates a method and apparatus for melting metal ingots of uniform weight and casting the metal at a rate equal to or proportional to the rate of melting of individual ingots.

In accordance with the invention, as set forth in the above mentioned earlier filed application, Serial No. 442,661, now abandoned, an elongated furnace is provided in the form of a tunnel placed adjacent to and inclined downwardly toward the perimeter of a turntable. Ingots are charged into the elevated end of the furnace and mechanically moved downwardly first through a preheating zone, which is cooler at the upper end than at the lower, and then through a melting zone. By the time an ingot reaches the lower end of the preheating zone, its temperature has been gradually raised to a point just short of melting. It then passes into the melting zone where it is melted and the molten metal flows into a small holding pot or reservoir provided in the floor of the furnace. The pot drains into a pouring ladle which is mechanically tripped to fill each mold as it passes underneath on the turntable. The entire operation is so timed that the ingots are melted at a rate to provide just sufficient molten metal in the pot to refill the ladle between each pouring with as little a margin of reserve as possible. Thus, in accordance with the invention is provided, in combination with a mold carrying turntable, a furnace, either gas fired or electrically heated, adapted to raise progressively the temperature of successive ingots of low melting metal such as aluminum so that each ingot will be fully melted just before it enters the holding pot or reservoir.

As a result, periodic charges of molten metal are added to the reservoir in accordance with the melting rate of individual ingots. Thus, the rate at which the ingots are moved downwardly through the furnace and the casting rate must be timed in relation to the rate of melting of a single ingot.

Hence, it is one of the objects of the invention to provide a fully automatic melting and pouring apparatus which permits the institution of a continuous melting, holding, pouring and molding operation in which cold ingots are fed in at one end of the line and solid castings are taken off at the other.

It is a more specific object of the invention to provide pouring apparatus which eliminates the use of large holding pots or crucibles and eliminates the problems of batch melting.

It is still a further object of this invention to provide pouring apparatus which is wholly or partly automatic, is faster than hand pouring methods and present day continuous casting methods, requires less fuel to operate than these methods and does not permit excessive heat with resultant fuel loss to escape into surrounding parts of the foundry.

Yet another object of the invention is to provide an improved melting method in which ingot feeding is coordinated with the pouring rate as a function of the melting rate characteristics of the particular metal.

As set forth in the aforementioned continuation-in-part application Serial No. 49,318, filed August 12, 1960, it has been further recognized and particularly where aluminum is being cast, that the aluminum ingots inherently have an oxide film or coating of considerable thickness when they are charged into the furnace. This coating remains as an envelope about the ingot even while in a partially molten state on the interior or at least until the liquid pressure exceeds the surface tension of the oxide film as discussed in U.S. Patent 2,882,142, issued April 14, 1959. Thus, during the entire heating period individual ingots are encased in their own aluminum oxide skins and when becoming molten on the interior, are protected from oxidation and from the absorption of hydrogen.

It has been found that with the use of infra-red radiant heating burners to heat the ingots, the problems of heat control and of melting each ingot separately at a particular rate are greatly alleviated.

Thus, another object of the invention is to provide a tunnel-like aluminum melting furnace having radiant heating burners spaced at predetermined intervals along the tunnel to melt the advancing aluminum ingots at a rate coordinated with the ingot feeding speed and the casting rate, both of which operate as a function of the melting characteristics of aluminum.

The features of the invention which are believed to be novel are set forth with particularity in the appended claims. The invention itself, however, both as to its organization and use, together with further objects and advantages thereof, may best be understood by reference to the following description taken in connection with the accompanying drawings in which:

FIGURE 1 is a plan view of the complete handling, melting, pouring and molding unit forming the subject matter of the invention;

FIGURE 2 is a side elevation on a different scale of that portion of the invention embodying the furnace and the mechanism by which the furnace is fed, the furnace being shown in longitudinal section;

FIGURE 3 is a plan view in detail, showing the drive mechanism for unloading the conveyor shown in FIGURE 2;

FIGURE 4 is a fragmentary plan view showing on a considerably enlarged scale the pouring ladle used to take metal from the furnace;

FIGURE 5 is a section through the furnace as indicated by the lines 5—5 on FIGURE 2;

FIGURE 6 is an enlarged elevation of the discharge end of the furnace.

The invention comprises the provision of an inclined tunnel-like furnace open and unobstructed from end to end into which ingots of aluminum are fed at the elevated end by mechanical conveyor means and pushed end to end slowly downwardly toward the lower end of the furnace. The furnace is lined, top, bottom and sides, with refractory brick, and additionally the bottom is covered with iron or steel angle members over which the ingots must slide. For further details of this bottom lining and its function reference is made to the aforementioned Patent No. 2,882,142, the disclosure of which is herewith incorporated by reference. Radiant gas burners providing primarily a good source of infrared heat are provided at the lower end of the furnace to provide a quantity of heat at a rate and temperature commensurate with, but not substantially in excess of, the capacity of the aluminum ingots to absorb the heat until the melting point of the interior of the ingot is reached. Additional burners provide a preheating zone to preheat the aluminum ingots as they are moved downwardly toward the melting zone. During the progress of the movement of an ingot in the furnace, it is brought to its melting temperature although not necessarily to a molten condition, due to the heat of fusion of aluminum which is substantially high and due further to the tough protective skin of aluminum oxide in which the aluminum is encased. Thus, during substantially the entire period of heating, the ingot is encased in an aluminum oxide sheath and protected from oxidation and from the absorption of hydrogen. Furthermore with an angle iron lining as described in combination with the infrared providing radiant burners, the ingots are protected on their tops and sides from oxidation during substantially their entire melting period. This because the ingots first soften and melt on their bottom portions adjacent the angle iron lining.

At the extreme lower end of the furnace is a molten aluminum reservoir. The progress of the ingot through the furnace is timed so that its arrival at the reservoir finds the ingot substantially melted within its aluminum oxide skin. The skin either ruptures at this point, due to internal pressure, permitting the molten aluminum to flow into the reservoir, or the ingot, upon being pushed into the reservoir by a following ingot, breaks its aluminum oxide skin, thereby freeing the molten aluminum. The size of the reservoir is predetermined to hold only a slight excess of that amount of molten aluminum necessary to provide a charge for each mold as it is passed beneath the reservoir. A suitable pouring ladle is provided in association with the furnace and is tripped automatically as each mold is passed therebeneath. Thus, the timing of the entire cycle is such that the ingots are melted substantially as fast as the aluminum is poured into the molds, thereby requiring but a minimum supply of molten aluminum in the reservoir. Inasmuch as the aluminum ingot is protected and maintained contamination free by virtue of being encased in an aluminum oxide skin during substantially the entire heating period, the molten aluminum discharged into the reservoir is also substantially contamination-free. In order to maintain this purity and further eliminate the dross or aluminum oxide skin from the pour metal, a baffle is inserted extending downwardly from the roof of the furnace to project beneath the surface of the molten aluminum in the reservoir. This baffle extends transversely across the reservoir and traps the aluminum oxide skin from further progress toward the pouring ladle. The dross is then skimmed from the surface of the reservoir from time to time as required, although very little dross actually accumulates either on the surface or settles to the bottom of the reservoir when compared to a reverberatory furnace.

A turntable or other conveyor means is positioned beneath the pouring ladle secured to the lower end of the furnace and is adapted to pass molds beneath the pouring ladle in timed relationship with the melting rate of the furnace so that only minimum sufficient molten aluminum is maintained available for pouring.

Referring now in particular to FIGURE 1, there is shown at 15 a conveyor which has a loading station at floor level where the ingots of metal to be melted are loaded. The conveyor is in the form of an endless chain belt having three separate chains 16 provided with a series of upstanding lugs to which are secured angle irons 17 extending across them at spaced intervals approximating the width of the furnace opening to prevent the ingots from sliding back as the conveyor carries them upwardly to the receiving end of the furnace. Each of the chains passes over a sprocket wheel 18 at each end of the conveyor and also over a sprocket wheel at the place where the upward path of the conveyor is altered to form an unloading area at the mouth of the furnace. The sprocket wheels are mounted on three shafts 20a, 20b and 20c as shown in FIGURE 1. The chains are driven by a motor 21 (see also FIGURE 2) and a chain drive 22 to shaft 20b. It will be apparent that other forms of continuous belts than chain may be used.

The ingots L, each of substantially the same weight, are loaded on the conveyor in groups as shown with their long axes crosswise of the direction of travel of the conveyor. The conveyor itself and the shafts 20a, 20b and 20c are supported on a structural iron framework 23 which at its upper portion forms the region defining an unloading area lying at an angle to the horizontal in an extended plane of the furnace floor as shown in FIGURE 2. To maintain this position at the unloading point, the entire conveyor belt and shafts 20a, 20b and 20c are somewhat tilted with respect to the horizontal as shown.

As stated, the ingots are loaded on the conveyor in groups separated one from the other by transverse spacers 17 secured to the conveyor belt. When a group of ingots reach the unloading station in the position shown at 25 opposite the furnace opening, a lug on the conveyor contacts a limit switch 26 which acts to cut off current to motor 21 and stop the conveyor. At the same time, it closes a circuit to supply current to a motor 42 which actuates a pusher 30 to advance the ingots into the furnace.

The pusher mechanism 30 is mounted on a structural steel framework 31 to lie in the general plane of the furnace and of the top portion 25 of the conveyor (FIGURE 2), and includes a pusher plate 32 in the form of a structural steel member which is slidably supported on framework 31. Pusher plate 32 is moved toward the open receiving end of the furnace tunnel by a pair of racks 34 and 35 (FIGURE 1) to which it is rigidly secured and which are also mounted for sliding motion on framework 31. The racks are guided in suitable slideways on the supporting frame 31 in a manner which will be familiar to those skilled in the art and therefore not further described. The racks themselves are driven toward the furnace by a pair of pinions 37 supported on a common shaft 38, journaled in the framework 31 and engaging adjacent racks. The shaft 38 is rotated by a sprocket chain or belt 39 driven from a sprocket wheel 40 out of a gear box 41. A suitable driving means, in the form of an electric motor 42, supplies power to the gear box through chain drive 43 (see FIGURE 3) and the speed reduction is such that the pusher plate 32 is slowly moved toward the furnace when the gears in the gear box are coupled through clutch 45 to the motor and the latter is driven. The clutch is normally held in position to maintain a drive by springs (not shown) but may be disengaged by pneumatic cylinder 47.

As the pusher plate approaches the furnace, it comes in contact with the ingots L on the conveyor 15 in its upper station at 25 and pushes them into the furnace. The preceding group of ingots which have previously been pushed into the furnace will be located adjacent the receiving end and will be pushed by the new group of ingots further down into the tunnel. After the pusher plate 32 has unloaded the conveyor, it contacts a limit switch 48. This limit switch through a solenoid air valve admits air to cylinder 47 to disengage clutch 45, stopping the forward motion of the pusher arm 32. Simultaneously the air is admitted to the rear of cylinder 50 in which is a piston 51 that is forced from right to left (FIGURE 1) pulling the pusher arm 32 and the racks 34 and 35 from a position adjacent the furnace to the retracted position shown in FIGURE 2. The mechanism is so arranged that the rack and pinion advance of the pusher arm is relatively slow while the fluid piston return is much faster.

After the pusher arm has been returned by the piston to its retracted position, a second limit switch 53 is engaged which again starts the conveyor motor 21 and through its sprocket drive chain 22 causes the conveyor to advance and bring the next group of ingots L into position to be loaded into the furnace. Simultaneously, the supply of current to the motor 42 is cut off until limit switch 26 again starts it in operation.

The furnace itself is indicated generally at 60 and is mounted on a structural iron framework having a series of supporting I beam posts 62 and suitable cross bracing 63. The furnace proper is mounted on the structural steel bed 64 carried on the posts 62. The furnace is in the form of an unobstructed tunnel 65 (FIGURES 5 and 6) made of fire brick, open at the receiving end, and extending in an inclined position downwardly to the pouring end. The floor of the furnace is supported on a fire brick base 66. This consists of a series of angle irons 67 laid transversely of the furnace on the fire brick with their corners facing up and supporting a steel plate 68. On top of plate 68 are a series of angle members 70 positioned as shown in FIGURE 5 closely adjacent each other, with their corner edges facing upwardly and extending from the receiving end of the floor into the region in which the ingots are melted. The roof of the furnace is also made of fire brick and is sloped with respect to the furnace floor as shown at 71 so that the floor to roof height is substantially less at the furnace mouth than at point 72 (FIGURE 2). From point 72 to point 73 the height is constant and from point 73 adjacent to the holding pot, the furnace roof is dropped as shown in FIGURE 2. The entire roof structure is supported from one or more steel beams 75 by supports 76 that pass through the roof and are secured to stainless steel angle members 77 placed back to back so their flanges extend across the furnace and under the adjacent rows of brick (FIGURE 6).

The furnace is radiantly heated by a gas-fired system, although electrical heating units may be provided if desired. Such system takes the form of a series of gas combustion nozzles 80 extending into the tunnel along the roof thereof and by suitable piping 81 to manifolds 82 and 83 along the sides of the furnace. The manifolds connect to a mixing chamber where air and gas are mixed in proper proportions. The gas nozzles 80 are concentrated at the lower end of the furnace between the pouring end and point 72 (FIGURE 2) where the actual melting and holding of the molten metal takes place and are so arranged that the heat is absorbed by the ingots at a particular rate in accordance with the melting characteristics of aluminum.

The sloping furnace roof directs the heat into preheating contact with the cold ingots as they first enter the furnace. The number, temperature, and capacity of burners, length of furnace and movement rate of ingots through the furnace are correlated with the heat of fusion of aluminum such that only sufficient heat to bring each ingot to the melting point within its aluminum oxide skin as it arrives at the reservoir 90 is provided. It is not possible as a practical matter to increase the rate of melting by increasing the burner capacity alone. To do so would provide heat in excess of the heat absorption capacity of the aluminum.

As a result, a novel method of melting aluminum is provided in which the ingots are preheated as they are gradually fed down the inclined tunnel into the melting zone until arriving at point 72, by which time the ingots have reached a temperature just below the melting point of the metal involved. The ingots then pass into the melting zone and without appreciable further movement are raised to a temperature at which the interior of the ingot is substantially if not entirely melted. Due to the fact that aluminum oxidizes rapidly, it is desirable that the melting and holding be accomplished in a non-oxidizing atmosphere. This result is attained by adjusting the combustion mixture so that substantially all of the oxygen present is consumed and passes in the form of carbon dioxide up along the furnace incline and out of the stack 85.

When the ingot oxide skins are ruptured, the molten metal passes into the small holding reservoir shown at 90 in FIGURE 6. The metal in the reservoir is subject to heat from only a sufficient predetermined number of gas nozzles 80 to maintain a molten condition. A baffle or skim gate 92, made of fire brick and suitably supported as an arch, extends from one side of the furnace to the other and from the tunnel top to somewhat below the liquid level in the reservoir to hold back surface scum from the top of the metal in the pot 90. The level of liquid metal in the pot is governed by the position of a pouring spout 93 which communicates therewith through an opening 95 in the fire brick forming the end of the furnace.

After the ingots have been melted and the metal flows into the reservoir 90, its level will fluctuate somewhat, and as the molten metal rises in the reservoir, it flows out through the opening 95 and is directed by the spout 93 into a pivoted pouring ladle 100.

The pouring ladle 100 is arranged to be tilted automatically to deposit the desired amount of metal into the molds as they pass beneath. (See FIGURES 4 and 6.) To this end, the ladle is pivotally supported at 102 on a bracket 103, secured at 104 to the lower end of the furnace and to the framework supporting the furnace. The bracket comprises two structural steel members 105 and 106 so arranged, as shown in FIGURE 4, that the ladle lies between them. The ladle is prevented from dropping counter-clockwise about its pivot by an adjustable stop (not shown) carried by the bracket. The ladle has depending from it a camming plate 110 by which it is rocked clockwise during the pouring operation. The plate 110 is pushed from the right to the left, as shown in FIGURE 6, by a projection (not shown) on each mold 115 and in so doing lifts the ladle to lower the lip 112 thereof and discharge metal which has accumulated in the basin portion 114 by virtue of overflow from the spout 93 as the ingots L are melted in the furnace and fill the reservoir 90.

The molds indicated at 115 (see FIGURE 1) are mounted on a turntable 120 positioned in the floor of the foundry and adapted slowly and continuously to rotate about an axis 121. Eight molds are shown in the present embodiment of the invention, but it will be understood that more or less may be provided as circumstances dictate. Likewise, the particular configuration of the mold will vary depending upon the size of the casting to be made.

From the foregoing description it will be seen that a novel and improved method and apparatus is provided specifically designed for commercial high production melting and casting of aluminum, wherein physical properties of aluminum are accommodated to aid in obtaining a better cast product.

Having thus described my invention, I claim:

1. A continuous casing installation comprising
 a furnace having a charging opening at one end, a molten metal holding basin at the other end with a pouring lip formed therein at a predetermined height about the bottom of the basin and radiant heating means spaced along the furnace to supply heat at a predetermined heat density,
 a ladle positioned below the pouring lip for collecting the overflow of metal from the holding basin,
 a series of individual molds moving adjacent the ladle, the mold movement being coordinated with the feeding and melting rate of ingots so that the overflow volume of metal collected during intervals between successive molds is substantially equal to the rate molten metal is being added to the holding basin, and
 means associated with each mold for discharging the ladle periodically when a mold is positioned opposite thereof whereby the level of metal in the holding basin remains nearly constant.

2. In apparatus of the class described, a continuous, tunnel-shaped aluminum heating and melting furnace having a discharge end and a receiving end and unobstructed therebetween, and with the interior roof surface of said furnace converging from bottom to top relative to the interior surface of the floor of said furnace, means to charge aluminum oxide encased ingots end to end and in abutting contact one with the other into said receiving end, said discharge end being lower than said receiving end, radiant heating means extending along said tunnel to slowly preheat said charge of aluminum ingots as they sequentially pass along said tunnel without melting the same, a non-shiftable reservoir at the discharge end of the said furnace to hold molten aluminum, means to heat and melt at a predetermined rate the interiors of only those ingots adjacent said reservoir, said predetermined rate being a function of the rate of pouring from said pouring mechanism into said molds, pouring mechanism to remove molten aluminum from said reservoir, a conveyor with a plurality of molds thereon positioned to pass said molds in succession beneath said pouring mechanism, and inter-engaging elements carried by said pouring mechanism and said mold respectively to cause said pouring mechanism to fill a respective mold as it passes said pouring mechanism.

3. In apparatus of the class described, a tunnel-shaped aluminum heating and melting furnace unobstructed and continuous from end to end with an inclined bed lower at the discharge end than at the receiving end, and the interior roof surface of said furnace converging from bottom to top relative to the interior surface of the floor of said furnace, an ingot charging mechanism to charge aluminum ingots into the receiving end of said tunnel one in abutting contact with the other, radiant heating means extending along said tunnel to heat a charge of oxide encased ingots as they sequentially pass along said tunnel to melt the interiors thereof in a combustion supporting atmosphere, a limited capacity non-shiftable reservoir at the discharge end of said furnace to hold only sufficient molten aluminum to provide continuous pouring; pouring mechanism to receive molten metal from said reservoir, and means to control said charging mechanism to feed aluminum ingots through said tunnel at a predetermined rate with respect to the discharge of molten aluminum at the lower end.

4. In apparatus of the class described, a continuous, tunnel-shaped aluminum heating and melting furnace having a discharge end and a receiving end and unobstructed therebetween, and with the interior roof surface of said furnace converging from bottom to top relative to the interior surface of the floor of said furnace, said furnace floor being lined with ingot supporting ferrous angle members arranged to permit sliding contact between ingots and said members, means to charge aluminum oxide encased ingots end to end and in abutting contact one with the other into said receiving end, said discharge end being lower than said receiving end, radiant heating means extending along said tunnel to slowly preheat said charge of aluminum ingots as they sequentially pass along said tunnel without melting the same, a non-shiftable reservoir at the discharge end of the said furnace to hold molten aluminum, means to heat and melt at a predetermined rate the interiors of only those ingots adjacent said reservoir, said predetermined rate being a function of the rate of pouring from said pouring mechanism into said molds, pouring mechanism to remove molten aluminum from said reservoir, a conveyor with a pluarlity of molds thereon positioned to pass said molds in succession beneath said pouring mechanism, and inter-engaging elements carried by said pouring mechanism and said molds respectively to cause said pouring mechanism to fill a respective mold as it passes said pouring mechanism.

5. In apparatus of the class described, a tunnel-shaped aluminum heating and melting furnace unobstructed and continuous from end to end with an inclined bed lower at the discharge end than at the receiving end, and the interior roof surface of said furnace converging from bottom to top relative to the interior surface of the floor of said furnace, said furnace floor being lined with ingot supporting ferrous angle members arranged to permit sliding contact between ingots and said members, an ingot charging mechanism to charge aluminum ingots into the receiving end of said tunnel one in abutting contact with the other, radiant heating means extending along said tunnel to heat a charge of oxide encased ingots as they sequentially pass along said tunnel to melt the interiors thereof in a combustion supporting atmosphere, a limited capacity non-shiftable reservoir at the discharge end of said furnace to hold only sufficient molten aluminum to provide continuous pouring; pouring mechanism to receive molten metal from said reservoir, and means to control said charging mechanism to feed aluminum ingots through said tunnel at a predetermined rate with respect to the discharge of molten aluminum at the lower end.

References Cited by the Examiner

UNITED STATES PATENTS

| | | | |
|---|---|---|---|
| 2,056,904 | 10/1936 | Morton | 263—6 |
| 2,060,134 | 11/1936 | Summey | 22—64 |
| 2,401,227 | 5/1946 | Campion | 263—6 |
| 2,549,790 | 4/1951 | Finkeldey | 22—63 |
| 2,709,529 | 5/1955 | Kleff et al. | 214—8 |

MARCUS U. LYONS, *Primary Examiner.*